US005182722A

United States Patent [19]

Hain

[11] Patent Number: 5,182,722

[45] Date of Patent: Jan. 26, 1993

[54] APPARATUS FOR ASSESSING THE STIFFNESS OF A SHEET

[75] Inventor: David A. Hain, Dundee, Scotland

[73] Assignee: NCR Corporation, Dayton, Ohio

[21] Appl. No.: 619,847

[22] Filed: Nov. 29, 1990

[30] Foreign Application Priority Data

Aug. 8, 1990 [GB] United Kingdom ................. 9017420

[51] Int. Cl.[5] .......................... B07C 1/16; B07C 5/34; G01L 5/04; G07D 7/00

[52] U.S. Cl. ................................ 364/551.01; 364/478; 194/207; 194/212; 271/259; 340/675; 250/559; 209/534; 209/576; 209/599; 209/699; 73/159; 73/767; 73/849

[58] Field of Search ............... 364/478, 507, 508, 516, 364/550, 551.01; 73/159, 760, 763, 767, 849, 854, 858; 250/559; 271/256, 258, 259; 340/674, 675; 194/207, 209, 208, 212, 239, 342; 209/534, 552, 576, 591, 599, 699

[56] References Cited

U.S. PATENT DOCUMENTS

| | | | |
|---|---|---|---|
| 2,860,510 | 11/1958 | Press | 73/159 |
| 3,026,726 | 3/1962 | Reading | 73/159 |
| 3,202,778 | 8/1965 | Fliegner et al. | |
| 3,552,563 | 1/1971 | Smith | 209/534 |
| 4,365,508 | 12/1982 | Loftus | 73/159 |
| 4,463,607 | 8/1984 | Hilton | 73/587 |
| 4,516,031 | 5/1985 | Kaule et al. | 209/534 X |
| 4,687,106 | 8/1987 | Prins | 209/552 |
| 4,690,284 | 9/1987 | Buckley et al. | 209/576 X |

FOREIGN PATENT DOCUMENTS

| | | |
|---|---|---|
| 0073133 | 8/1982 | European Pat. Off. . |
| 0129280 | 12/1984 | European Pat. Off. . |
| 0357406 | 3/1990 | European Pat. Off. . |
| 2134657 | 8/1984 | United Kingdom . |

*Primary Examiner*—Parshotam S. Lall
*Assistant Examiner*—Edward J. Pipala
*Attorney, Agent, or Firm*—Albert L. Sessler, Jr.

[57] ABSTRACT

The invention relates to an apparatus (2) for assessing the stiffness of a sheet (4), such as a currency note, by measuring the extent and rate of movement of the trailing edge of the sheet (4) away from a feed path for the sheet. Such movement is part of a straightening movement of the sheet (4) upon disengagement of the trailing edge from constraining means (34) when a leading portion of the sheet (4) is in a bent condition.

11 Claims, 4 Drawing Sheets

APPARATUS FOR ASSESSING THE STIFFNESS OF A SHEET

BACKGROUND OF THE INVENTION

The present invention relates to an apparatus for assessing the stiffness of a sheet and more particularly, but not exclusively, to an apparatus for assessing the stiffness or crispness of paper sheets such as currency notes.

Prior to the loading of currency notes into currency cassettes for use with ATMs it is important to screen the currency notes to detect their condition. In particular there is a requirement to detect and reject currency notes having holes, voids, soiling or having attachments such as tape or staples. It is also important to detect whether or not a currency note has the necessary degree of stiffness or crispness for satisfactory handling by a cash dispensing mechanism, and, if it does not, the currency note should be rejected to insure that it is not loaded into a currency cassette.

An apparatus for determining the condition of currency notes by assessing their stiffness is disclosed in European Patent Application No. 0073133. This prior art apparatus determines the condition of a currency note on the basis of the noise made by the currency note as it is bent around a bobbin-shaped drum. This prior art technique has the disadvantage that, as a result of noise interference, incorrect determinations of the stiffness of currency notes may be made. A further disadvantage of the prior art apparatus is that the deformation and crinkling of the currency notes as they are passed round the bobbin-shaped drum tend to produce wear of the currency notes, which is contrary to the normal objective of preserving serviceable currency.

SUMMARY OF THE INVENTION

According to the invention there is provided an apparatus for assessing the stiffness of a sheet comprising conveying means for conveying said sheet along a feed path; bending means in said feed path for providing a curvature in said sheet; constraining means for constraining the trailing edge of said sheet to move along said feed path until said curvature has been imparted to at least a portion of said sheet and until said trailing edge has moved past a predetermined location along said feed path; sensing means arranged for detecting movement of said trailing edge away from said feed path after said trailing edge has moved past said predetermined location; and data processing means for assessing the stiffness of said sheet in response to the output of said sensing means.

An object of the present invention is to provide an apparatus for determining the stiffness of a sheet, such as a currency note, utilizing a high speed and accurate sheet handling arrangement for determining its stiffness.

With this and other objects, which will become apparent from the following description, in view, the invention includes certain novel features of construction and combinations of parts, a plurality of forms or embodiments of which are hereinafter described with reference to the drawings which accompany and form a part of this specification.

DETAILED DESCRIPTION

Figure 1:
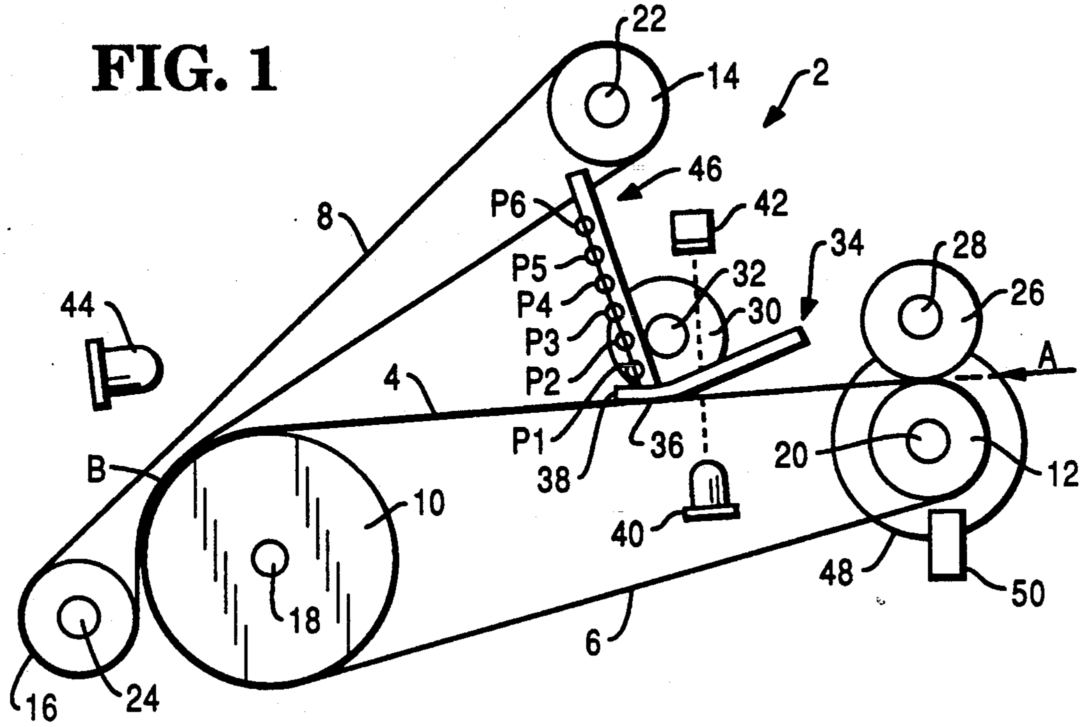
FIG. 1 is a schematic side elevational view of part of an apparatus in accordance with one embodiment of the invention, the apparatus having a currency note therein restrained from movement away from a feed path for the note.
Figure 8:
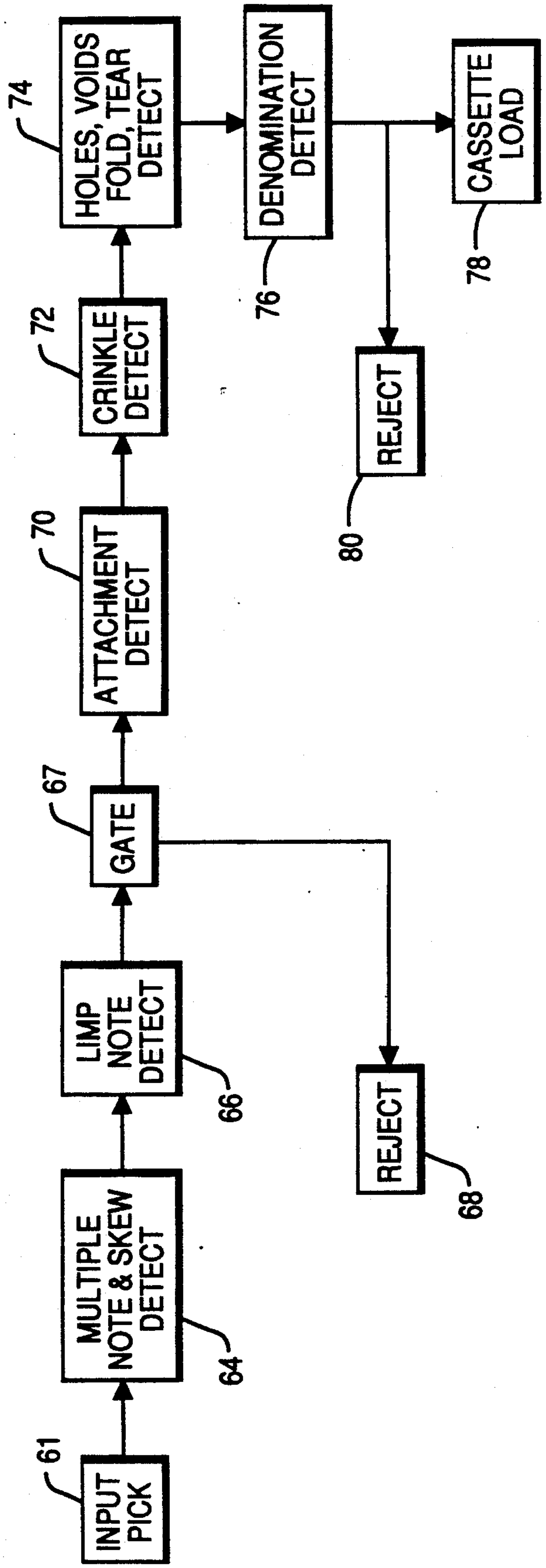
FIG. 8 is a block diagram illustrating the features of a currency cassette loading system incorporating an apparatus in accordance with the invention.

Referring to FIGS. 1 and 8, the apparatus 2 shown in FIG. 1 forms part of a limp note detect apparatus 66 in accordance with the invention, which in turn forms part of a currency cassette loading system shown in FIG. 8. The currency cassette loading system also includes a note picker mechanism 61 and a multi-note detection system 64, both of which are located upstream of the apparatus 2. The note picker mechanism 61 is arranged to pick currency notes from a stack of such notes and feed them along a belt and pulley transport mechanism to the multi-note detection station 64 which determines whether or not the currency notes are being fed sequentially and individually to the apparatus 2. The other features of thee currency cassette loading system will be described later with reference to FIG. 8.

The apparatus 2 includes a belt and pulley transport mechanism including first and second endless belts 6, 8, each of which passes around respective pulleys 10, 12 and 14, 16 mounted on respective shafts 18, 20, 22, 24. The top generally horizontal surface of the endless belt 6 defines a feed path for a currency note 4 extending from right to left in the direction of arrow A as shown in FIG. 1. An idler roller 26 mounted on a shaft 28 is arranged to rotate in frictional engagement with the top surface of the endless belt 6 to define therebetween an entry nip through which the currency note 4 is fed into the apparatus 2. The roller 26 is disposed immediately above the pulley 12 and the shaft 28 is mounted in parallel relationship with the shaft 20. A further idler roller 30 is mounted on a shaft 32 located downstream of the pulley 26, the roller 30 also being arranged to rotate in frictional engagement with the top surface of the endless belt 6 to define therebetween a further nip through which the currency note 4 must pass on its journey along the feed path. It should be understood that each of the pulleys 10, 12, 14 and 16 comprises a series of separate pulleys spaced apart along the respective shaft 18, 20, 22 or 24, and each of the endless belts 6, 8 comprises a series of separate belts, each of which passes around a respective pair of pulleys. Similarly, each of the rollers 26 and 30 comprises a series of separate rollers spaced apart along the respective shaft 28 or 32.

A steel plate-like member 34 having a bent portion 36 is mounted adjacent the roller 30. The portion 36 is arranged to be spaced slightly above, and in parallel relationship to, the top surface of the belt 6 so that the end 38 of the portion 36 is located slightly downstream of the nip defined between the roller 30 and the top surface of the belt 6. By this arrangement the portion 36 serves as a constraining member for constraining the trailing edge of the currency note 4 so that it continues to move along the feed path, as shown in FIG. 1, until the trailing edge has moved past the end 38 of the portion 36. Optical sensing means comprising an LED 40 and a cooperating phototransistor sensor 42 are mounted a short predetermined distance upstream of the end 38 for the purpose of sensing the trailing edge of the currency note 4 as it is fed from the entry nip of the belt 6 and the roller 26 towards the roller 30 along the feed path.

The first and second endless belts 6, 8 are mounted in cooperative relationship at a location further downstream along the feed path and are arranged to grip the leading edge of the currency note 4 so as to feed it around a portion of the perimeter of the pulley 10 thereby imparting a curvature to the currency note 4. In FIG. 1 the curved leading edge portion of the currency note 4 is identified generally by the letter B.

Further optical sensing means comprising a light source 44 and a cooperating photodiode array 46 are mounted above the top surface of the belt 6 for the purpose of sensing upward movement of the trailing edge of the currency note 4 after it has moved past the edge 38. In FIG. 1 the photodiode array 46 is shown to comprise a linear arrangement of six equispaced photodiodes P1, P2, P3, P4, P5 and P6.

A timing disc 48 is mounted on one end of the shaft 20 to rotate therewith and is associated with an optical sensing means shown generally as numeral 50. The signals generated from the optical sensing means 50 comprise a series of timing pulses which are spaced apart by predetermined time intervals, determined by the speed of rotation of the shaft 20 and hence representative of the speed of movement of the currency note 4 along the feed path. These timing pulses are applied to data processing means 62 (FIG. 7), and are used by the data processing means 62, in cooperation with a trailing edge detection signal from the sensor 42 which is also applied to the data processing means 62, to determine the exact time when the trailing edge of the currency note 4 reaches a position along the feed path beneath the end 38.

Figure 2:
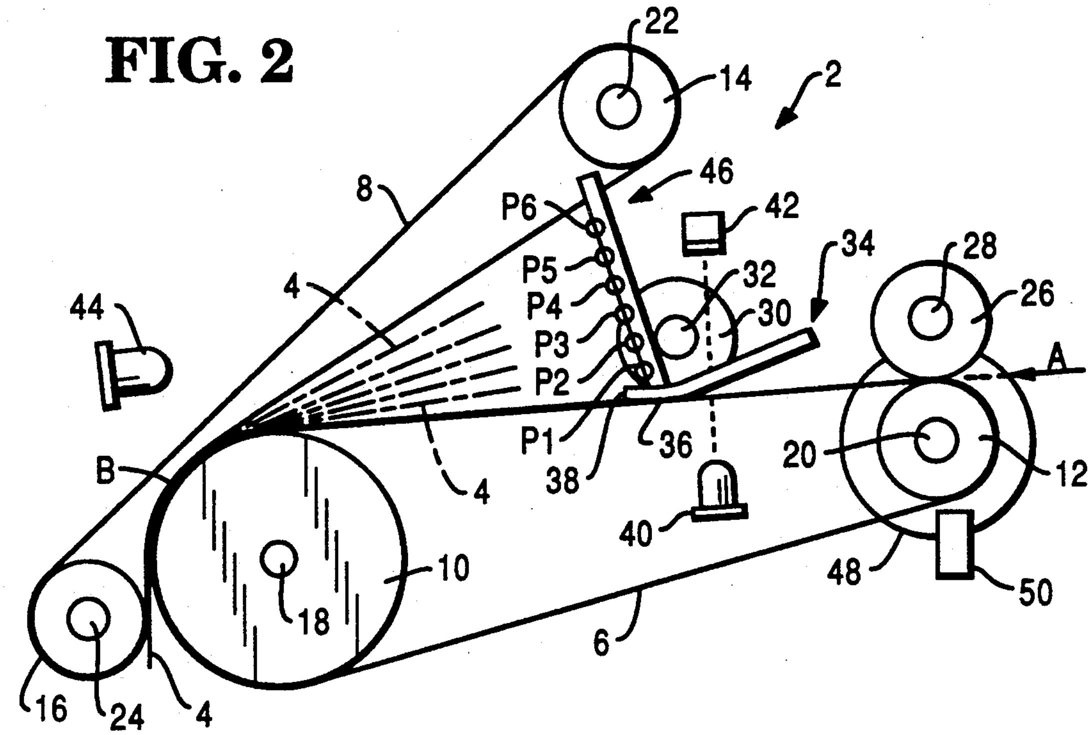
FIG. 2 is a view similar to FIG. 1 showing in chain lines the position of a crisp currency note at successive equal time intervals after its trailing edge has traveled beyond note constraining means.

The apparatus 2 of FIG. 1 is also shown in FIG. 2. In FIG. 2 there are shown by chain lines the positions of the currency note 4 at successive equal time intervals after its trailing edge has traveled along the feed path past the edge 38, it being assumed that the note 4 is in a new or good condition. After passage of the trailing edge of the currency note 4 beyond the edge 38, the end portion of the currency note 4, being that portion which has not yet been gripped between the first and second endless belts 6, 8, moves in a counterclockwise direction away from the endless belt 6 as part of a straightening movement of the currency note 4. The extent to which the end portion of the currency note 4 moves away from the endless belt 6 (i.e. away from the feed path) in a counterclockwise direction, as well as the rate of such movement, is dependent on the upwardly acting force which was imparted to that end portion just prior to the passage of the trailing edge beyond the edge 38 along the feed path. The upwardly acting force is dependent on the crispness or stiffness of the currency note 4 and hence the extent and rate of movement of the end portion of the currency note 4 in a counterclockwise direction away from the endless belt 6 is dependent on the crispness or stiffness of the currency note 4.

Figure 3:
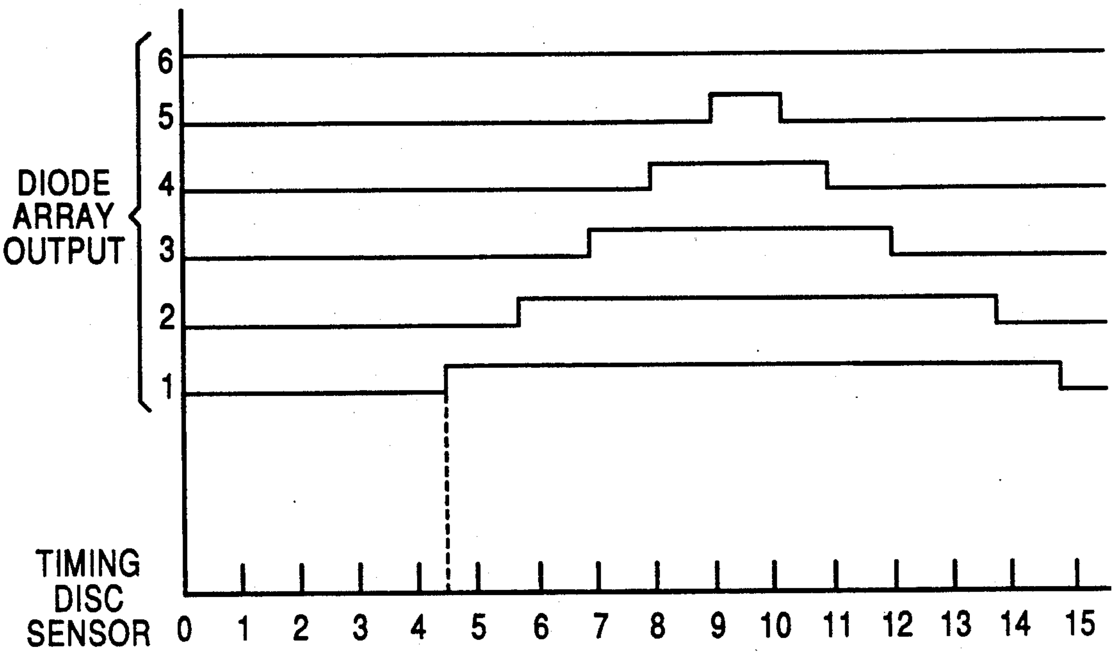
FIG. 3 is a diagram illustrating the signal outputs received from photosensing means for the crisp currency note shown in FIG. 2.

The counterclockwise rotation of the end portion of the crisp currency note 4 as illustrated in FIG. 2 finishes when the end portion hits the surface of the endless belt 8. During the counterclockwise rotation of the end portion of the currency note 4, its trailing edge sweeps out an upward path sequentially blocking of the light reaching each of the photodiodes P1, P2, P3, P4, and P5 from the light source 44. The light from the light source 44 is eventually received again by each of the photodiodes P5, P4, P3, P2 and P1 in turn as the trailing edge of the currency note 4 is steadily pulled down towards the pulley 10. The output signals from the photodiodes P1, P2, P3, P4, P5 and P6 are applied to the data processing means 62, the signals generated by the photodiodes during the counterclockwise rotation of the end portion of the crisp currency note 4 being illustrated in FIG. 3. A trailing edge sensor pulse from the phototransistor sensor 42 is transmitted to the data processing means 62 as the trailing edge of the currency note 4 passes beyond the sensor 42 in its passage along the feed path. The transmission of the trailing edge sensor pulses defines a reference point shown as 0 from which timing pulses received from the sensing means 50, referred to in FIG. 3 as the timing disc sensor, are counted. The speed of the endless belt 4 is such that after transmission of three consecutive timing pulses from the sensing means 50 the trailing edge of the currency note 4 passes beyond the edge 38 along the feed path. The trailing edge of the currency note 4 moves in a counterclockwise direction and in so doing cuts off the light to each of the photodiodes P1, P2, P3, P4 and P5 in turn until the trailing edge is fed downwardly around the pulley 10. As shown in FIG. 3, photodiode 1 has the light from the light source 44 cut off for the longest period while the photodiode 5 has the light cut off for the shortest period. Light from the light source 44 continuously illuminates the photodiode P6 during the counterclockwise movement of the trailing edge of the note 4. The data processing means 62 processes the signals received from the photodiodes P1, P2, P3, P4, P5 and P6 to determine not only the number of photodiodes which have had their light cut off but also to calculate with reference to the timing pulses from the timing disc sensor 50 the speed of movement of the trailing edge along its swept out path.

Figure 4:
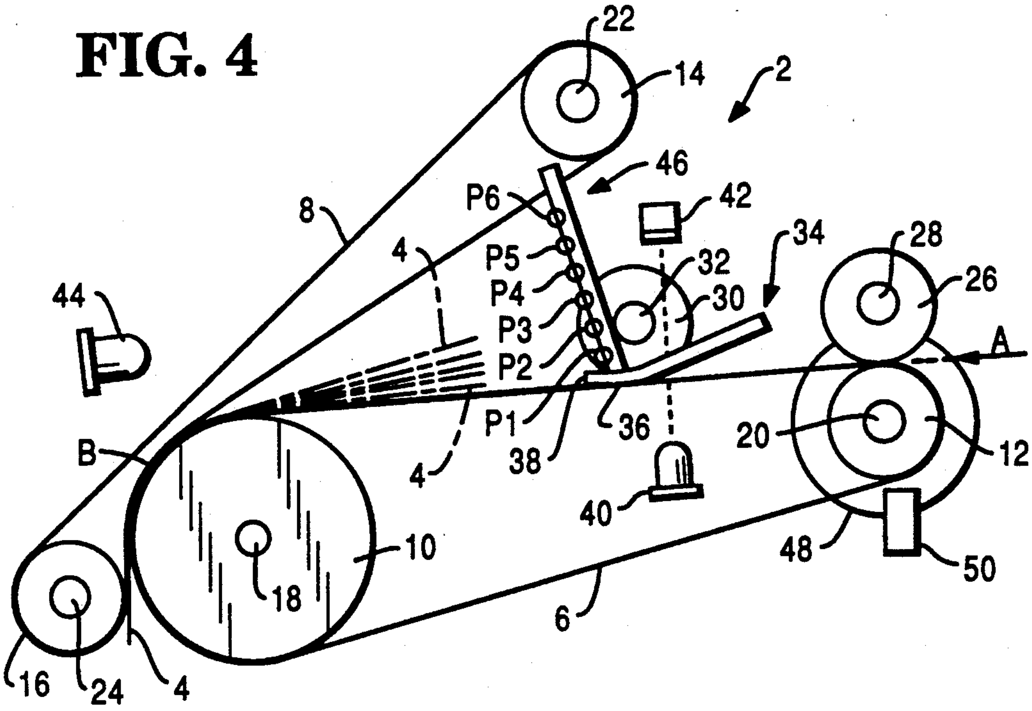
FIG. 4 is a view similar to FIG. 1 showing in chain lines the position of a limp currency note at successive equal time intervals after its trailing edge has traveled beyond the constraining means.
Figure 5:
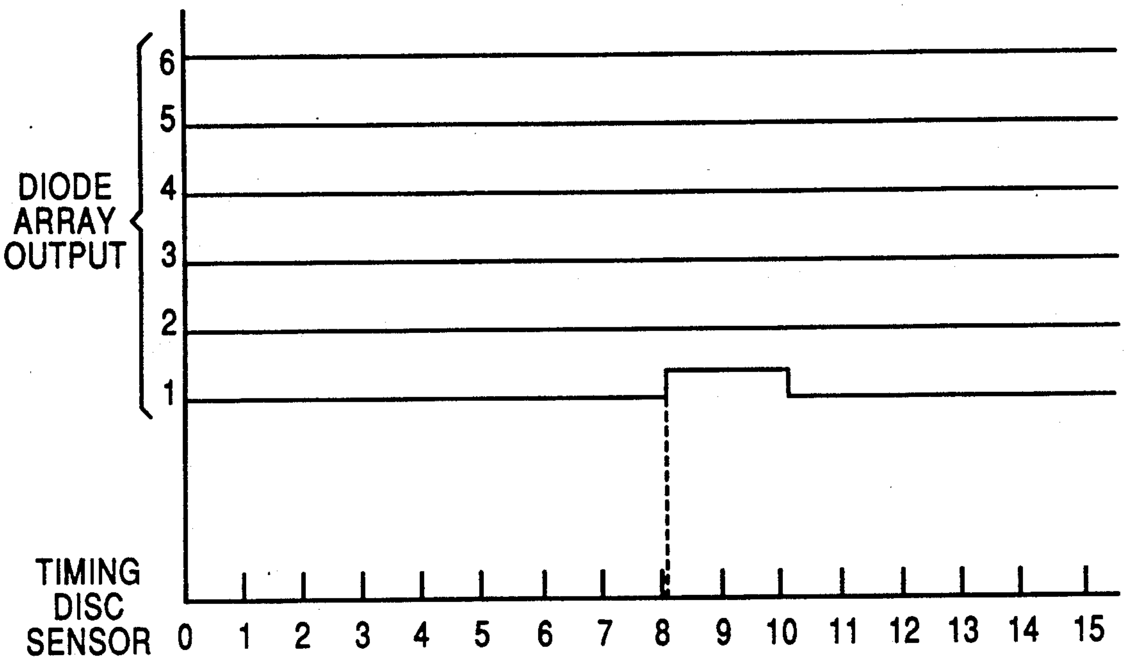
FIG. 5 is a diagram illustrating the signal outputs received from the photosensing means for the limp currency note shown in FIG. 4.

In FIG. 4 there are shown by chain lines the positions of the currency note 4 at successive equal time intervals after its trailing edge has moved past the edge 38, it being assumed that the note 4 is limp or in bad condition. In this instance the currency note 4 has very little stiffness and consequently after its trailing edge has cleared the edge 38 the spring effect acting on the end portion is only sufficient to move the trailing edge upwardly to cut off the light to photodiode P1. Light from the light source 44 continues to illuminate the other photodiodes P2, P3, P4, P5, and P6. FIG. 5 shows that the only change in illumination detected is for the photodiode 1, and the data processing means 62 will assess the currency note 4 as being too limp and therebefore to be rejected as being unsuitable for loading into a currency cassette.

Figure 6:
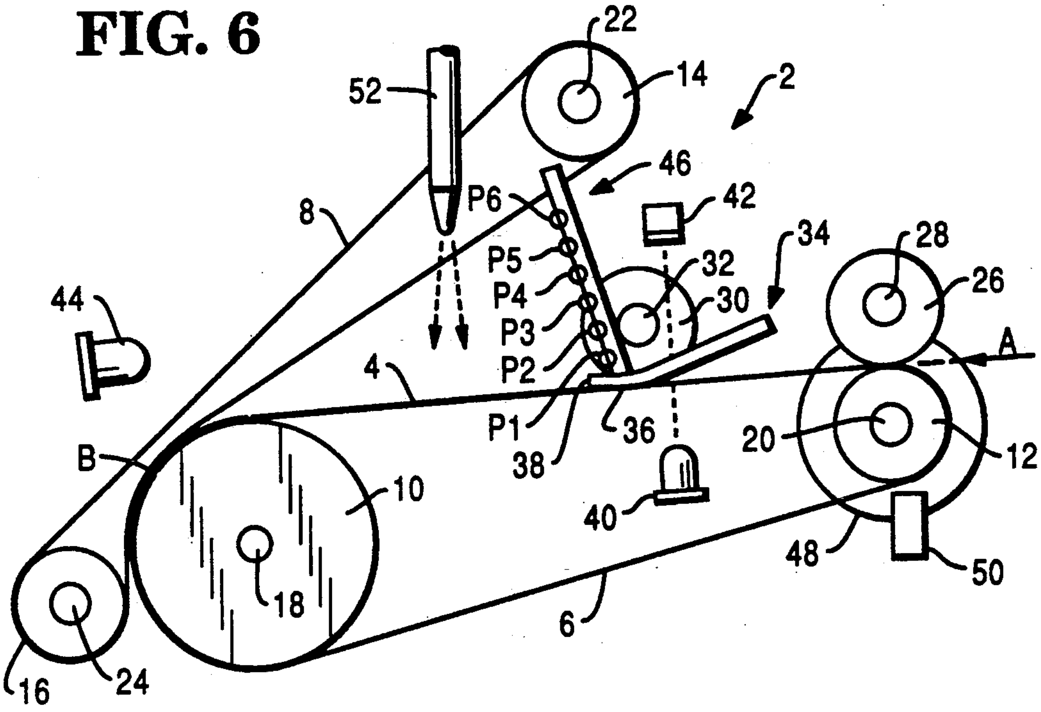
FIG. 6 is a schematic side elevational view of part of an apparatus in accordance with a further embodiment of the invention, the apparatus having a currency note therein restrained from movement away from the feed path.

Referring to FIG. 6, the apparatus 2 shown therein is identical to that illustrated in FIG. 1 except for the inclusion in FIG. 6 of an air jet nozzle 52. The air jet nozzle 52 is disposed above the top surface of the endless belt 6 and is arranged to direct a controlled air jet downwardly onto the currency notes 4 as they pass along their feed path beyond the edge 38. By the use of the controlled air jet a partial opposing force is applied to the trailing portion of the currency note 4, thereby providing a means of controlling its upward counterclockwise movement. The provision of the controlled air jet is an aid in some instances during the initial calibration of the apparatus 2 and also enables the apparatus 2 to handle and determine the stiffness of a wide variety of currency notes or like sheet materials.

Figure 7:
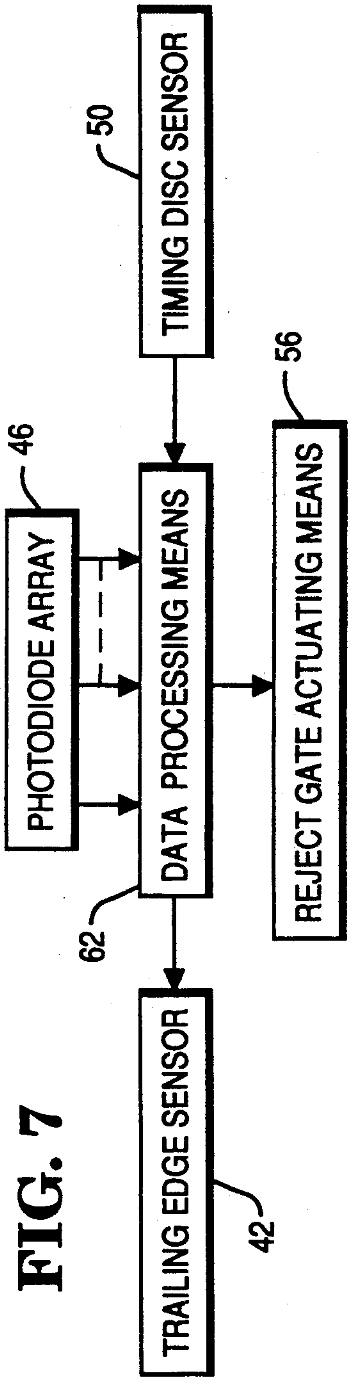
FIG. 7 is a block diagram illustrating the electrical interconnections of an apparatus in accordance with the invention associated with reject gate actuating means.

Referring to FIG. 7, the trailing edge sensor 42 provides an output pulse to the data processing means 62 when the trailing edge of the currency note 4 has been sensed by sensor 42. This output pulse causes the data processing means 62 to begin counting the timing pulses generated by the timing disc sensor 50. Following movement of the trailing edge of the currency note 4 past the edge 38, one or more of the photodiodes P1, P2, P3, P4, P5 and P6 apply a pulse to the data processing means 62, the number of pulses applied being dependent on the number of photodiodes to which light has been blocked by the trailing edge of the currency note 4. The data processing means 62 processes the data received pertaining to the number of photodiodes which have had their light blocked, and also the number of timing pulses counted between the reference point 0 and the instant when each photodiode in turn (possibly only one photodiode) was blocked of its light. The larger the number of photodiodes which have had their light blocked, the stiffer is the currency note 4. Also the faster the movement of the trailing edge of the currency note 4 away from the feed path, the stiffer is the currency note 4. In this connection, it should be understood that the smaller the number of timing pulses counted between the instant that the trailing edge of the note 4 moves past the edge 38 (reference point 3 in FIGS. 3 and 5) and the instant that light to a particular photodiode is blocked, then the faster is the rate of movement of the trailing edge of the note 4 away from the feed path. The data processing means 62 is arranged to determine whether or not the note 4 meets predetermined stiffness criteria, these criteria being based on the number of photodiodes to which light is blocked by the note 4, and the rate at which the trailing edge of the note moves away from the feed path. If the data processing means 62 finds that the note 4 fails to meet these criteria then it sends an actuating pulse to a reject gate actuating means 56 (FIG. 7). Referring to FIG. 3, there is shown only one timing pulse between the reference point 3 and the instant when the trailing edge of the currency note 4 blocks off the light to the first photodiode P1. This is representative of a much stiffer currency note 4 than that recorded by the results shown in FIG. 5. In FIG. 5 there are shown five timing pulses between the reference point 3 and the instant when the trailing edge of the note 4 blocks off the light to the first photodiode P1.

Referring to FIG. 8, there is shown in block form a currency cassette loading system incorporating the limp note detect apparatus 66 in accordance with the present invention. The limp note detector 2 is located downstream of the note picker mechanism 61 and the multinote detection station 64, the functions of which have been described earlier. Currency notes 4 which have been determined by the data processing means 62 as having a stiffness not meeting required criteria are diverted by a gate 67 to a reject container 68. Currency notes meeting the required criteria are transported via the gate 67 to a detector 70 which detects the presence of staples or other attachments to the currency notes 4. It should be understood that the gate 67 is settable to a first position in which it permits notes to pass to the detector 70 or to a second position in which it diverts notes to the reject container 68 under the control of the reject gate actuating means 56 (FIG. 7), operation of the actuating means 56 being controlled by output signals from the data processing means 62. After passing them through the detector 70, currency notes are then fed in turn through a detector 72 which detects crinkles, through a detector 74 which detects holes, voids and folds, and through a detector 76 which detects the denomination value of the notes. If the currency notes are found to be unacceptable by any of the detectors 70, 72 and 74 or to be one of the wrong denomination by the detector 76, they are transported along a branch line to a further reject container 80. Otherwise they are loaded into a currency cassette 78.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. An apparatus for assessing the stiffness of a sheet, comprising:
- conveying means for conveying said sheet along a feed path;
- bending means in said feed path for providing a curvature in said sheet;
- constraining means for constraining the trailing edge of said sheet to move along said feed path until said curvature has been imparted to at least a portion of said sheet and until said trailing edge has moved past a predetermined location along said feed path;
- sensing means arranged for detecting movement of said trailing edge away from said feed path after said trailing edge has moved past said predetermined location; and
- data processing means for assessing the stiffness of said sheet in response to the output of said sensing means.

2. The apparatus of claim 1, in which said sensing means comprises a light source and a cooperating array of optical sensors which are coupled to said data processing means and which are arranged relative to said feed path, whereby movement of said trailing edge away from said feed path temporarily blocks off the light reaching at least one of said optical sensors, the number of optical sensors to which light is blocked being dependent on the stiffness of said sheet.

3. The apparatus of claim 2, in which said data processing means is arranged to process data pertaining to the number of optical sensors to which light is blocked and the rate of movement of said trailing edge away from said feed path to provide an output signal indicative of whether or not said sheet meets predetermined stiffness criteria.

4. The apparatus of claim 3, also including second sensing means responsive to passage of said trailing edge past a sensing location upstream of said predetermined location along said feed path for providing a reference timing signal to said data processing means.

5. The apparatus of claim 4, also including third sensing means arranged for transmitting to said data processing means timing pulses which are spaced apart by predetermined time intervals representative of the speed of movement of said sheet along said feed path.

6. The apparatus of claim 1, in which said bending means includes pulley means having a perimeter and first and second cooperating endless belts arranged to feed said sheet around a portion of the perimeter of said pulley means, thereby imparting said curvature to said sheet.

7. The apparatus of claim 6, in which said constraining means is a plate member arranged adjacent of said first endless belt to define therebetween part of the feed path for said sheet.

8. The apparatus of claim 6, in which said conveying means includes said first endless belt and roller means arranged to be in rolling contact with said sheet during its passage along said feed path.

9. The apparatus of claim 1, also including air jet means arranged for directing a controlled air jet onto said sheet to provide a force on said sheet to oppose partially the movement of said trailing edge away from said feed path.

10. The apparatus of claim 3, also including gate means settable to a first position for directing a sheet which has passed through said apparatus to a first container for loading therein, or to a second position for directing said sheet to a second container, said output signal from said data processing means serving to control the setting of said gate means.

11. The apparatus of claim 10, in which said sheet is a currency note, said first container is a currency cassette, and said second container is a reject container.

* * * * *